United States Patent
Fujiwara et al.

(10) Patent No.: US 7,205,984 B2
(45) Date of Patent: Apr. 17, 2007

(54) PEN INPUT DISPLAY DEVICE

(75) Inventors: Koji Fujiwara, Tenri (JP); Naoto Inoue, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 519 days.

(21) Appl. No.: 10/673,389

(22) Filed: Sep. 30, 2003

(65) Prior Publication Data
US 2004/0080498 A1   Apr. 29, 2004

(30) Foreign Application Priority Data
Oct. 28, 2002   (JP) .............................. 2002-313537

(51) Int. Cl.
*G09G 5/00* (2006.01)
(52) U.S. Cl. .................... 345/177; 178/18.04
(58) Field of Classification Search ........ 345/173–179; 178/18.01–19.07
See application file for complete search history.

(56) References Cited
U.S. PATENT DOCUMENTS
4,814,552 A   3/1989   Stefik et al.
5,717,168 A * 2/1998   DeBuisser et al. ....... 178/18.04
6,535,147 B1 * 3/2003   Masters et al. ............. 341/34

* cited by examiner

*Primary Examiner*—Alexander Eisen
(74) *Attorney, Agent, or Firm*—Birch, Stewart, Kolasch & Birch, LLP

(57) ABSTRACT

A pen input unit includes ultrasonic receivers that receive an ultrasonic signal transmitted from an ultrasonic transmitter of an input pen. Based on the received signal, the distance (distance value) of the ultrasonic transmitter from each of the ultrasonic receivers is determined. The distance value is used for the display control of the display panel, and is supplied to a reception sensitivity control section. The reception sensitivity control section carries out reception sensitivity control for reducing a difference in level of the respective waveforms received by the ultrasonic receivers. As a result, a pen input display device of an ultrasonic pen input system is provided that prevents errors over the entire input area of the display panel without increasing power consumption or impairing operability of pen entry.

5 Claims, 19 Drawing Sheets

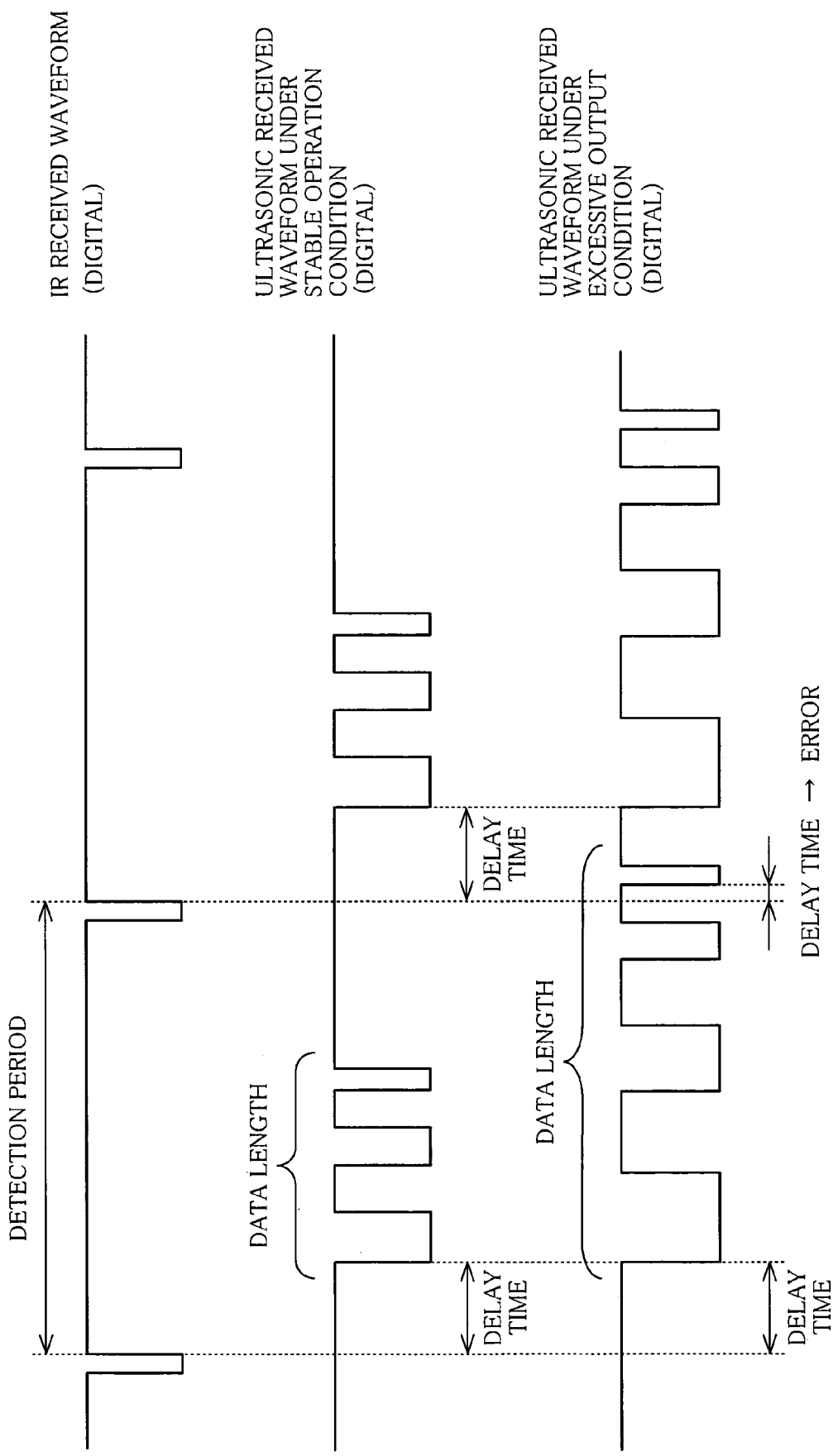

PEN INPUT DISPLAY DEVICE

CROSS REFERENCE TO RELATED APPLICATION

This Nonprovisional application claims priority under 35 U.S.C. § 119(a) on Patent Application No. 2002/313537 filed in Japan on Oct. 28, 2002, the entire contents of which are hereby incorporated by reference.

BACKGROUND OF THE INVENTION

Field of the Invention

The present invention relates to pen input display devices for finding the coordinates of a point of pen entry by detecting the positional information of the pen entry.

Display panels of a tablet-integrated type in which a transparent tablet and a display panel are provided in one piece are pervasive as one form of a conventional pen input display device that allows for pen entry on a display panel. Among various types of tablet-integrated display panels, those employing a resistive film method for the transparent tablet have been most common. The display panel of an integrated type employing a resistive film method for the transparent tablet has a structure in which a transparent tablet for detecting coordinates is provided in front of the display panel.

In the tablet-integrated display panel, pen entry is made on the transparent tablet that is disposed on the display panel. This brings about a phenomenon known as "parallax", in which the tip of the pen is separated from the display position on the display panel. Further, despite transparency, the transparent tablet stacked on the display panel reduces the surface luminance of the display screen.

In light of this problem, there has been proposed an ultrasonic pen input system that allows for pen entry without providing the transparent tablet on the display panel. In this system, an ultrasonic transmitter installed in the input pen transmits ultrasound, and receivers installed in the display panel receive the incoming ultrasound. The location of pen entry is then determined by calculating the position of the input pen relative to the display panel based on the received signals. Such an ultrasound pen input system is disclosed, for example, in U.S. Pat. No. 4,814,552 of Stefik et al.

Referring to FIG. 11 through FIG. 14, the following describes the ultrasonic pen input system.

FIG. 11 (a) illustrates an exemplary structure of the foregoing US patent. A pen input unit 101 is disposed in the vicinity of a display panel 100. The pen input unit 101 includes two ultrasonic receivers 102 and 103, and a single IR (Infrared Rays) receiver 104. An input pen 120 includes an ultrasonic transmitter 121 and an IR transmitter 122, as shown in FIG. 11(b). The tip of the input pen 120 is a switch 123.

In the input pen 123 is installed a microcomputer 126 for controlling respective outputs of an ultrasonic transmitter 121 and an IR transmitter 122 via an ultrasonic transmitting circuit 124 and an IR transmitting circuit 125, as shown in FIG. 12. That is, the microcomputer 126 causes the ultrasonic transmitter 121 and the IR transmitter 122 to transmit signals when the input pen 120 contacts the display panel 100 and the switch 123 of the input pen 120 is closed. A battery (not shown) installed in the input pen 120 provides power to the ultrasonic transmitter 121, the IR transmitter 122, the ultrasonic transmitting circuit 124, the IR transmitting circuit 125, and the microcomputer 126.

Next, description is made as to how the location of pen entry of calculated in the ultrasonic pen input system of the foregoing configuration.

When the input pen 120 contacts the display panel 100, the switch 123 at the tip of the input pen 120 is closed, causing the ultrasonic transmitter 121 and the IR transmitter 122 to simultaneously transmit an ultrasonic signal and an IR signal, respectively. Then, a signal delay time from the transmission to the reception of the ultrasonic signal is measured by each of the ultrasonic receivers 102 and 103. Here, assuming that the IR signal reaches the IR receiver 104 without any delay, the measurement of signal delay time is triggered by the reception of the IR signal (see FIG. 13).

The signal delay time of the ultrasonic signal can be determined by, for example, counting. Specifically, the time from the transmission of the ultrasonic signal from the ultrasonic transmitter 121 to the reception by each of the ultrasonic receivers 102 and 103 is measured by clock count, and the signal delay time is obtained by multiplying the counts with the clock frequency.

The signal delay time so obtained in each of the ultrasonic receivers 102 and 103 is then multiplied with the speed of propagation of the ultrasonic signal (i.e., the speed of sound), so as to obtain the distance of the ultrasonic transmitter 121 from each of the ultrasonic receivers 102 and 103. The ultrasonic receivers 102 and 103 have a fixed distance.

The coordinates (X, Y) of a point on the display panel 100 where the ultrasonic transmitter 121 is positioned is then obtained from distances L1, L2, and L0, as shown in FIG. 14, where L1 is the distance between the ultrasonic transmitter 121 and the ultrasonic receiver 102, L2 is the distance between the ultrasonic transmitter 121 and the ultrasonic receiver 103, and L0 is the distance between the ultrasonic receiver 102 and the ultrasonic receiver 103. The coordinates of the ultrasonic transmitter 121 so determined are used as the coordinates of the input pen 120.

Referring to FIG. 15 and FIG. 16, the following more specifically describes how the position of pen entry (coordinates) is calculated.

As shown in FIG. 15, the ultrasonic signal transmitted by the ultrasonic transmitter 121 of the input pen 120 is received by the ultrasonic receivers 102 and 103 in the pen input unit 101. The respective waveforms of the received ultrasonic signal are amplified by amplifier circuits 105 and 106, and are converted from analog data into digital data in A/D converter circuits 107 and 108, respectively. The resultant signals are sent to a delay time difference count circuit 109.

The IR signal simultaneously transmitted from the IR transmitter 122 with the ultrasonic signal is received by the IR receiver 104 in the pen input unit 101, and is amplified in an amplifier circuit 110. As with the ultrasonic signal, the waveform of the received IR signal is sent to the delay time difference count circuit 109.

The delay time difference count circuit 109 detects signal delay times based on the respective waveforms of the ultrasonic signals and the IR signal it receives. The signal delay times, corresponding to the respective waveforms received by the ultrasonic receivers 102 and 103, are transmitted as time values A and B, respectively, to detected value processing sections 111 and 112.

As shown in FIG. 16, the time values A and B transmitted from the delay time difference count circuit 109 are converted by calculation into distance values A and B in the detected value processing sections 111 and 112, respectively. The distance values A and B are further converted by the coordinates conversion processing section 113 into a coordinates value (X, Y) for the display panel 100. The coordinates value (X, Y) is then displayed on the display panel 100 by the coordinates display processing section 114.

The ultrasonic pen input system described above does not require a transparent tablet in front of the display panel 100, and therefore does not cause parallax. Further, because there is no reduction in transmittance through the transparent tablet, pen entry can be made without impairing display quality.

However, the conventional ultrasonic pen input system as configured above causes the following problems.

For example, the intensity of the received ultrasonic signal becomes weaker as the distance between the ultrasonic transmitter and the ultrasonic receiver increases, with the result that an error such as jitter is caused in the detected value (detected value varies). Worse, the ultrasonic receivers may fail to receive the ultrasonic signal completely, disabling the input functionality.

Such a problem can be solved by increasing the transmission intensity of the ultrasonic transmitter. However, this is associated-with two problems.

One problem is that increased transmission intensity in the ultrasonic transmitter increases power consumption of the input pen. As noted above, the input pen operates on a battery, and accordingly increased power consumption means shorter operating hours for the input pen. Therefore, increased power consumption in the input pen is a serious problem.

Another problem is that the signal intensity of the received waveform becomes too strong when the distance between the ultrasonic transmitter and the ultrasonic receivers is close, even though the increased transmission intensity can reduce errors in a far distance. Consequently, increased signal intensity of the received waveform increases noise, generating errors in a short distance. That is, it is difficult with the conventional ultrasonic pen input system to prevent errors over the entire area of the display panel.

These problems are discussed in more detail below with reference to FIG. 17 through FIG. 19.

FIG. 17 shows an exemplary structure of the ultrasonic transmitter 121 and the ultrasonic transmitting circuit 124 illustrated in FIG. 12. The ultrasonic transmitting circuit 124 includes a coil L1, a diode D1, a switching element TR, and a resistor R1. In the ultrasonic transmitting circuit 124, the coil L1, the diode D1, and the switching element TR (e.g., MOS transistor) are connected in series. The microcomputer 126 feeds a control signal to control ON/OFF of the switching element TR. The ultrasonic transmitter 121 is connected to the coil L1 and the resistor R1 in parallel.

In the ultrasonic transmitting circuit 124, when the control signal is High ("1"), the switching element TR is turned ON to charge the coil L1 with the power of a power supply. When the control signal is Low ("0"), the switching element TR is turned OFF, enabling the stored charge in the coil L1 to flow into the ultrasonic transmitter 121 and generate ultrasound therein.

FIG. 18 illustrates waveforms of the transmitted and received ultrasonic signal.

The control signal from the microcomputer 126 is turned OFF after an ON period of a predetermined length. In response, the ultrasonic transmitter 121 transmits an ultrasonic signal. The waveform of the ultrasonic signal is produced during an ON period of the control signal by the inflow of the stored charge in the coil L1, as described above. The coil L1 generates electromotive force by self-induction, and because the coil L1 is connected to the resistor R1 and the ultrasonic transmitter 121 (serving as a capacitor) in parallel, the transmitted waveform undergoes damped oscillation.

In the pen input unit 101, the A/D converter circuits_107 and 108 convert, from analog data into digital data, the waveforms of the ultrasonic signals received through the ultrasonic receivers 102 and 103 and the amplifier circuits 105 and 106.

In the A/D conversion, the conversion into a digital value is based on a predetermined sensitivity border value that determines whether the amplitude value of the received waveform is "1" or "0". In FIG. 18, the amplitude value above the sensitivity border value is a "0" and below the sensitivity border value is "1". These digital values may be reversed.

Comparing the respective waveforms of the received and transmitted ultrasonic signals, it can be seen that the both waveforms undergo attenuation. The extent of attenuation in the received waveform depends on the transmission distance or the sensitivity (gain) of the ultrasonic receiver.

FIG. 19 shows how analog data of the received waveform is related to its digital form when the distance between the ultrasonic transmitter and the ultrasonic receivers is in (I) a close range, (II) a middle range, and (III) a long range.

As described, the extent of attenuation of the received waveform depends on the transmission distance or the sensitivity (gain) of the receivers. Accordingly, there are cases where the A/D conversion, which is possible in a close range, may not be carried out in a long range, with the result that the digital data cannot be received. That is, due to large attenuation, the received analog waveform in a long range has the maximum amplitude below the sensitivity border value, which produces a flat waveform when converted into digital data.

On the other hand, as described above, increasing the transmission intensity of the ultrasonic transmitter 121 to sufficiently transmit a signal even in a long range produces a signal of excessive intensity for the received waveform in a close range. In addition, power consumption is increased. This is described below in more detail with reference to FIG. 20.

FIG. 20 shows a received waveform of the IR signal, and received waveforms of the ultrasonic signal under stable operating condition and excessive output condition. (It is assumed here that the position of the input pen is the same under these different conditions.)

The waveform of the received IR signal is a pulse of a predetermined period. The pulse interval of the received IR waveform is the detection period. The pulse of the received IR waveform is used as a trigger for the detection of the distance between the ultrasonic transmitter and the ultrasonic receivers, so that the detection is carried out one after another at the intervals of the detection period.

The shorter the detection period, the greater the amount of data detected in a given time. Thus, smooth and easy-to-operate pen entry with good tracking ability can be realized with a shorter detection period. Conversely, the operability of pen entry suffers when the detection period is long, because it spoils the smoothness and tracking ability of pen entry.

It can be seen from the waveform of the received ultrasonic signal under stable condition that the data length is within the detection period, i.e., no error is caused. As used herein, the term "data length" is the length of a portion of the pulse that is generated when the received analog waveform is converted into digital form.

On the other hand, in the waveform of the received ultrasonic signal under excessive output condition, the amplitude of the received waveform exceeds the sensitivity border value for an extended period of time as a result of the excessive output for the ultrasonic signal. As a result, the data length is increased. In the example of FIG. 20, the combined length of the signal delay time and the data length is longer than the detection period. As a result, the detected data of the previous detection period remains in the current detection period, causing a signal delay time to be detected based on the pulse waveform of the remaining data, with the result that an error is caused.

Such an error may be avoided by increasing the detection period. However, increasing the detection period does not offer a good solution to the problem because a long detection period impairs operability of pen entry, as described above.

SUMMARY OF THE INVENTION

The present invention was made in view of the foregoing problems, and accordingly it is an object of the present invention to provide a pen input display device of an ultrasonic pen input system for preventing errors over the entire input area of the display panel, without increasing power consumption or impairing operability of pen entry.

In order to solve the foregoing problems, the present invention provides a pen input display device for making pen entry on a display panel using an input pen having an ultrasonic transmitting section, the pen input display device including at least two ultrasonic receiving sections that are in a fixed spatial relationship with the display panel, the pen input display device including: a distance detecting section for detecting a parameter that directly or indirectly indicates a distance of the ultrasonic transmitting section from each of the ultrasonic receiving sections; and a received waveform control section for carrying out control of reducing a difference in level of received waveforms, based on a result of detection by the distance detecting section, when the ultrasonic receiving section receive an ultrasonic signal from the ultrasonic transmitting section.

As a rule, in the pen input display device employing an ultrasonic pen input system using an input pen with an ultrasonic transmitting section, the attenuation of the ultrasonic signal becomes greater on the receiver end as the distance of the ultrasonic transmitting section from the ultrasonic receiving section (the distance between the ultrasonic transmitter and the ultrasonic receiver) is increased. Accordingly, the level of the received waveform in the ultrasonic receiving section varies depending on the distance between the ultrasonic transmitter and the ultrasonic receiver. Errors occur when the received waveforms are at different levels.

However, according to the foregoing configuration, the distance detecting section directly or indirectly detects a distance between the ultrasonic transmitter and each of the ultrasonic receivers, and the received waveform control section carries out the control of reducing a difference in level of the respective received waveforms in the ultrasonic receiving section based on the result of detection. In this way, the errors caused by different levels of the received waveforms can be restricted. As a result, a pen input display device is provided that can prevent errors over the entire input area of the display panel.

The distance detecting section directly or indirectly detects a distance between the ultrasonic transmitter and an ultrasonic receiver. That is, in the ultrasonic pen input system, the distance between the ultrasonic transmitter and the ultrasonic receiver is determined by converting a delay time difference (time value) of the ultrasonic signal into a distance value. The time value, being a parameter that indirectly indicates the distance between the ultrasonic transmitter and the ultrasonic receiver, can thus be used to control received waveforms.

For a fuller understanding of the nature and advantages of the invention, reference should be made to the ensuing detailed description taken in conjunction with the accompanying drawings.

BRIEF DESCRIPTION OF THE DRAWINGS

FIG. 20 is a waveform diagram illustrating how errors occur in the conventional pen input display device when the distance between the ultrasonic transmitter and an ultrasonic receiver is short.

DESCRIPTION OF THE INVENTION

[First Embodiment]

One embodiment of the present invention is described below with reference to the attached drawings. First, reference is made to FIG. 2 to describe a configuration of a pen input display device according to this embodiment.

Figure 2:
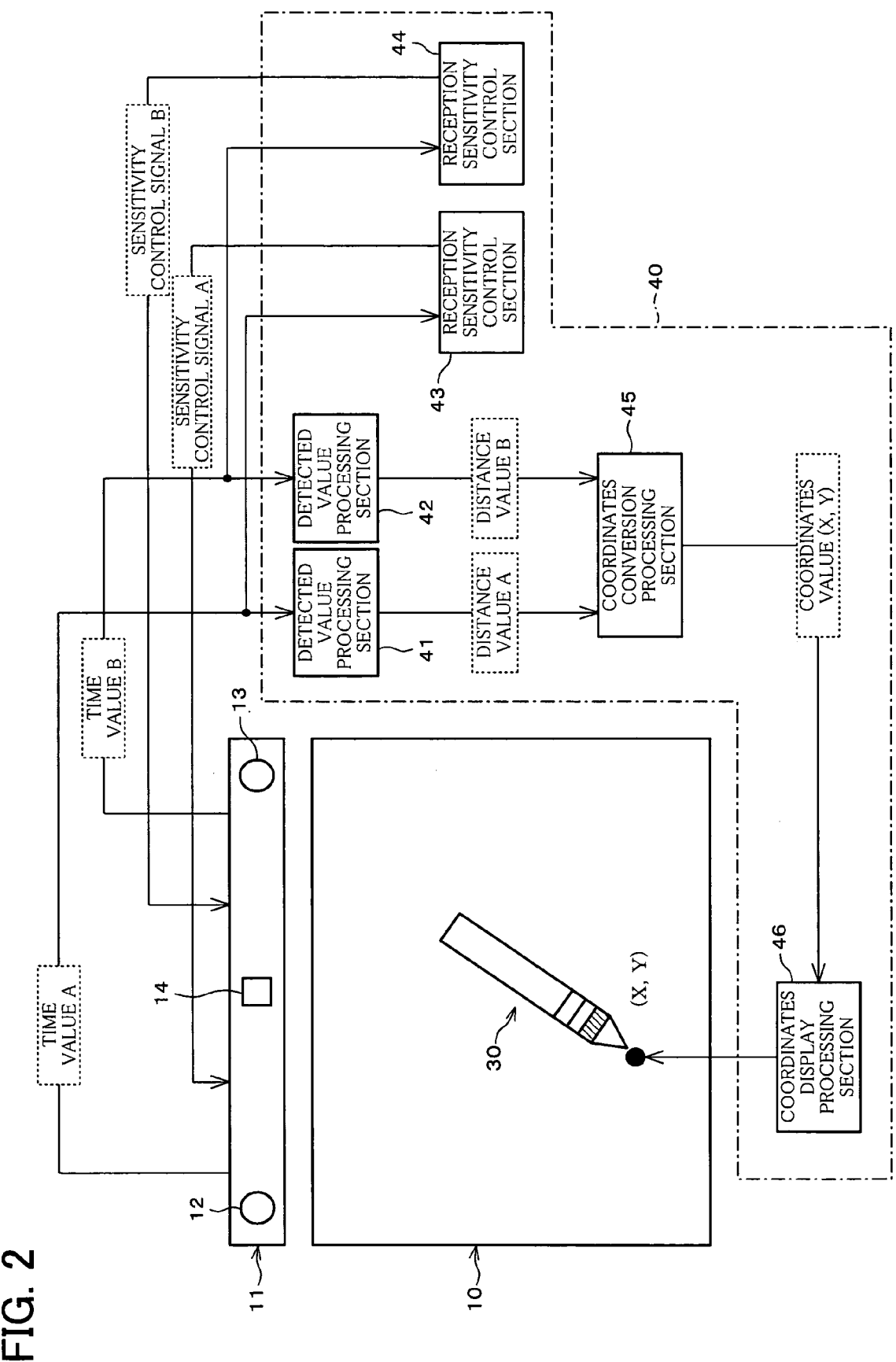
FIG. 2 is a block diagram showing a schematic configuration of the pen input display device.
Figure 3:
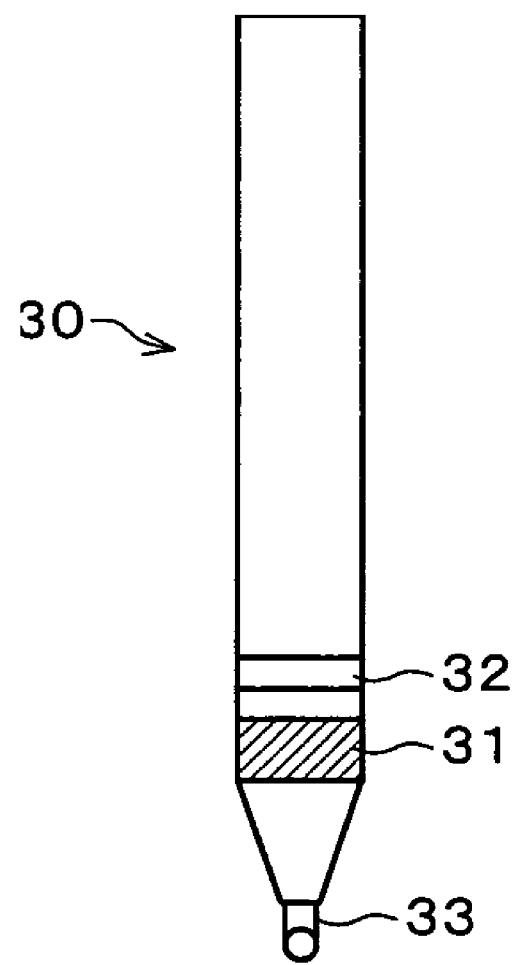
FIG. 3 is a drawing showing an input pen used with the pen input display device.
Figure 16:
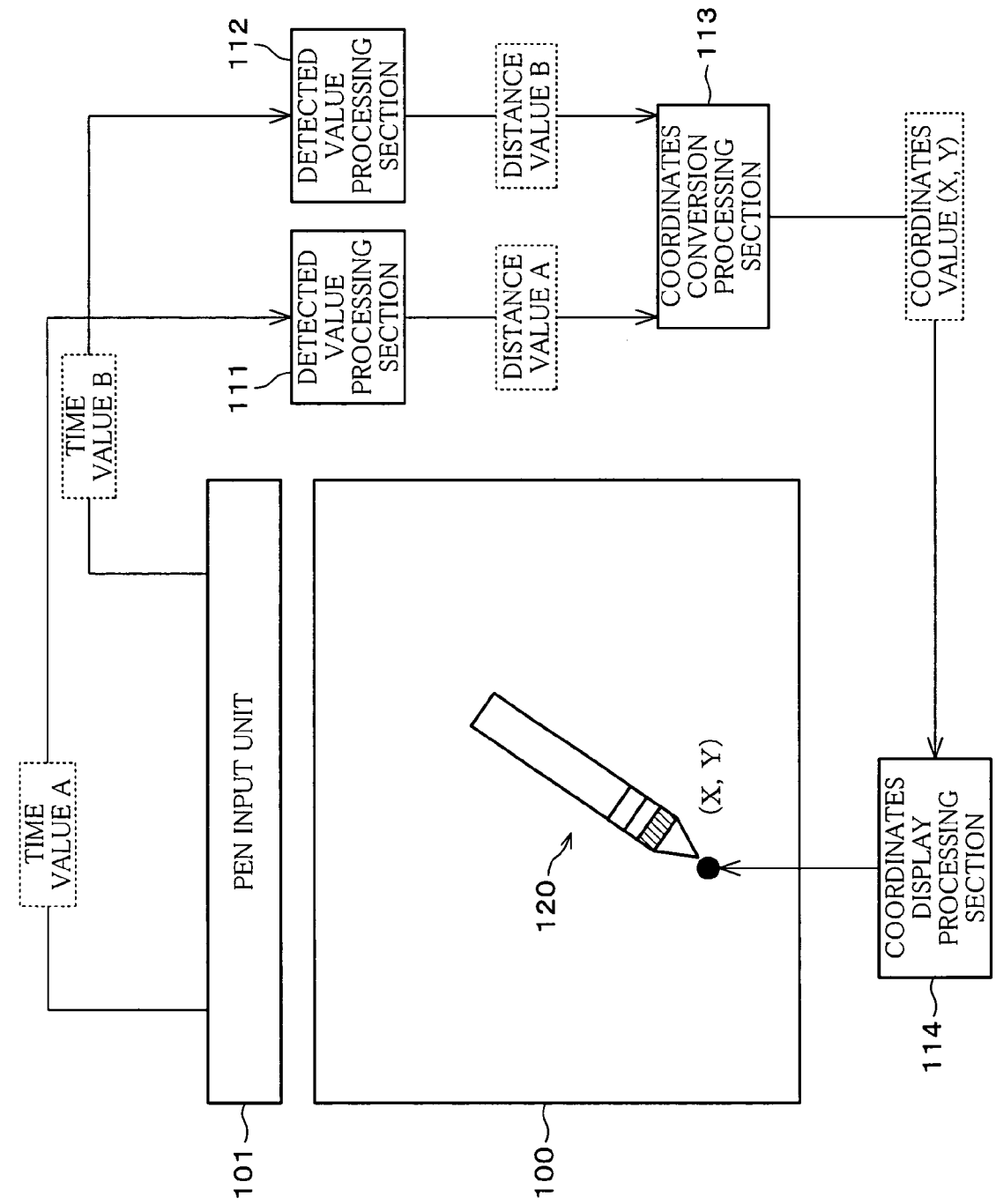
FIG. 16 is a block diagram showing a schematic structure of the conventional pen input display device.

The pen input display device according to the present embodiment is one form of a display device of an input/output-integrated type, in which pen entry is directly made to a display panel. The pen input display device includes a display panel 10, a pen input unit 11, an input pen 30, and a display control unit 40, as illustrated in FIG. 2. In the configuration shown in FIG. 2, the display panel 10 and the input pen 30 are similar to the display panel 100 and the input pen 120, respectively, described earlier with reference to FIG. 16.

Specifically, in the pen input display device according to the present embodiment, the pen input unit 11 is disposed in the vicinity of the display panel 10, and two ultrasonic receivers 12 and 13 and a single IR receiver 14 are mounted on the pen input unit 11. The input pen 30 has an ultrasonic transmitter 31, an IR transmitter 32, and a switch 33, the switch 33 being located at the tip of the input pen 30.

Note that, the positions of the ultrasonic receivers 12 and 13 and the IR receiver 14 on the pen input unit 11 are not limited to the example shown in FIG. 2, provided that they are placed along the edges of the liquid crystal display panel 10.

The display control unit 40, which is realized by a CPU for example, is a means for controlling display of the display panel 10 based on the result of detection by the pen input unit 11. The display control unit 40 includes detected value processing sections 41 and 42, reception sensitivity control sections 43 and 44, a coordinates conversion processing section 45, and a coordinates display processing section 46. In the configuration shown in FIG. 2, the detected value processing sections 41 and 42, the coordinates conversion processing section 45, and the coordinates display processing section 46 are similar, both structurally and functionally, to the detected value processing sections 111 and 112, the coordinates conversion processing section 113, and the coordinates display processing section 114, respectively, described earlier with reference to FIG. 16.

Figure 1:
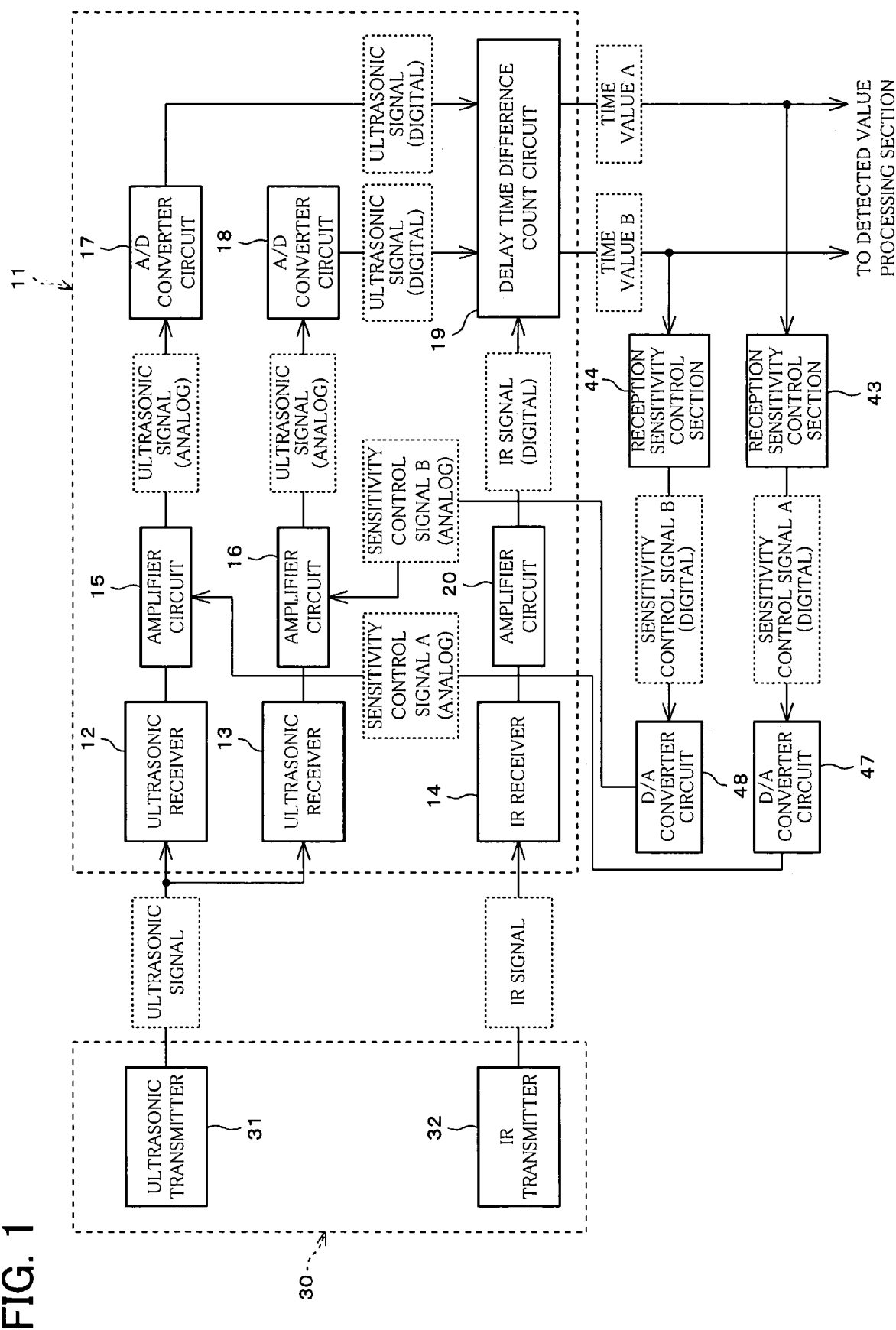
FIG. 1 is a block diagram showing a partial configuration of a pen input display device according to one embodiment of the present invention.

Referring to FIG. 1, the following describes the process operations of the pen input display device having the foregoing configuration. The structure diagramed in FIG. 1, partially showing the input pen 30, the pen input unit 11, and the display control unit 40, relates to functions of the pen input display device for adjusting reception sensitivity of the pen input unit 11 to attain high detection accuracy and thereby prevent errors over the entire input area of the display panel 10.

When the input pen 30 contacts the liquid crystal display panel 10, the switch 33 installed at the tip of the pen is closed, enabling the ultrasonic transmitter 31 to transmit an ultrasonic signal. Simultaneously, the IR transmitter 32 transmits an IR signal. The delay of the ultrasonic signal from the transmission to the reception by the ultrasonic receivers 12 and 13 is measured in each of the ultrasonic receivers 12 and 13. The measurement of the signal delay time is triggered by the reception of the IR signal by the IR receiver 14. The signal delay time may be measured by clock count, for example.

The ultrasonic signals received by the ultrasonic receivers 12 and 13 are amplified by amplifier circuits 15 and 16, respectively, and are converted from analog data to digital data in A/D converter circuits 17 and 18, respectively, to be sent to a delay time difference count circuit 19.

The IR signal transmitted from the IR transmitter 32 simultaneously with the ultrasonic signal is received by the IR receiver 14 and is amplified in an amplifier circuit 20. As with the ultrasonic signal, the waveform of the received IR signal is transmitted to the delay time different count circuit 19.

The delay time difference count circuit 19 detects signal delay times based on the respective waveforms of the ultrasonic signals and the IR signal it receives. The signal delay times, corresponding to the respective waveforms received by the ultrasonic receivers 12 and 13, are transmitted as time values A and B to the detected value processing sections 41 and 42, respectively.

As shown in FIG. 2, the time value A transmitted from the delay time difference count circuit 19 is supplied to the detected value processing section 41 and the reception sensitivity control section 43 of the display control section 40. Similarly, the time value B from the delay time difference count circuit 19 is supplied to the detected value processing section 42 and the reception sensitivity control section 44 of the display control section 40. The time values A and B supplied to the detected value processing sections 41 and 42 are respectively converted into distance values A and B by calculations in the detected value processing sections 41 and 42. The distance values A and B are further converted by the coordinates conversion processing section 45 into a coordinates value (X, Y) for the display panel 10. The coordinates value (X, Y) is then displayed on the display panel 10 by the coordinates display processing section 46.

The time values A and B supplied to the reception sensitivity control sections 43 and 44 are used for reception sensitivity control for preventing errors over the entire area of the display panel 10. The feature of the pen input display device according to the present embodiment resides in the reception sensitivity control. The following describes in detail how such control is carried out.

In the pen input display device according to the present embodiment, in response to the input of the time values A and B processed by the delay time difference count circuit 19, the reception sensitivity control sections 43 and 44 control values of reception sensitivity according to the values of the time values A and B. That is, the reception sensitivity is decreased when the time values A and B are small (close range), whereas the reception sensitivity is increased when the time values A and B are large (long range).

More specifically, the reception sensitivity control sections 43 and 44, based on the input time values A and B, determine the distance of the ultrasonic transmitter 31 from each of the ultrasonic receivers 12 and 13, respectively. The reception sensitivity control sections 43 and 44 then respectively output the results as sensitivity control signals A and B (digital values). The sensitivity control signals A and B are converted into voltage values by D/A conversion in the D/A converter circuits 47 and 48, respectively. These sensitivity control signals A and B (analog values) are then respectively supplied to the amplifier circuits 15 and 16 for feedback.

The amplifier circuits 15 and 16 vary their gains based on the feedback voltage values of the sensitivity control signals A and B, thereby carrying out reception sensitivity control in which the gain is decreased for a close range to decrease reception sensitivity, and is increased for a long range to increase reception sensitivity.

Figure 4:
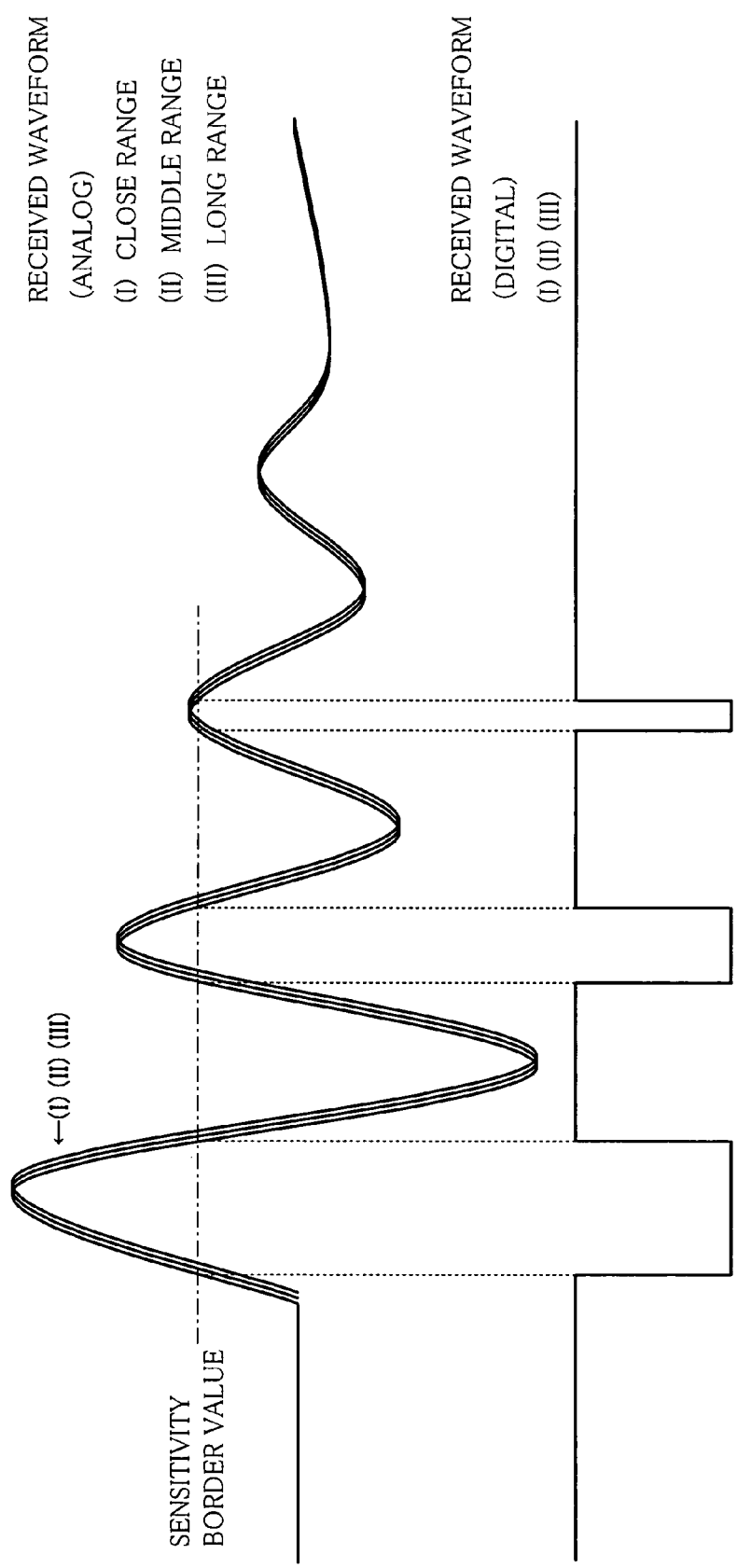
FIG. 4 is a waveform diagram showing waveforms of an ultrasonic signal in the pen input display device.
Figure 19:
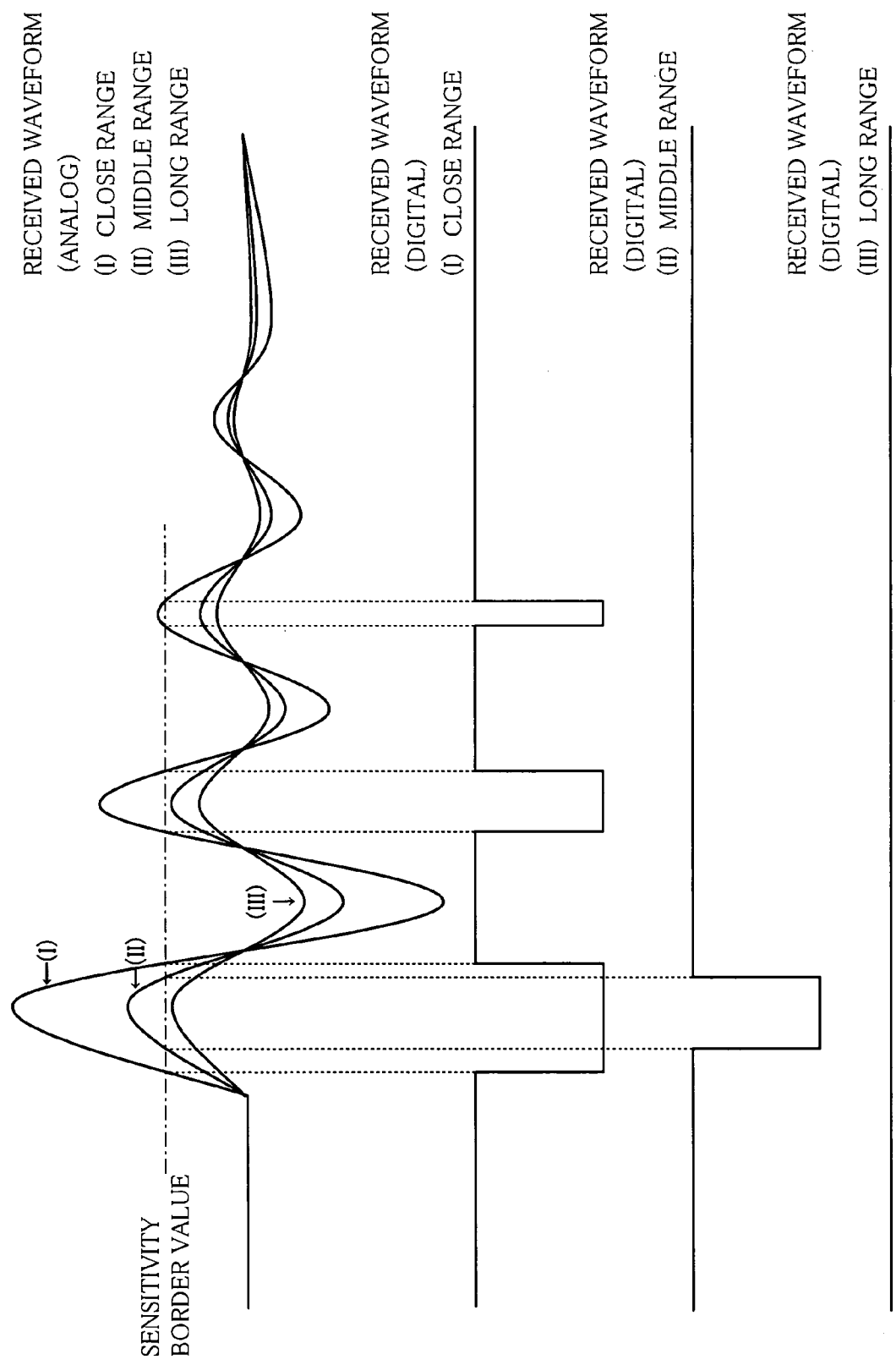
FIG. 19 is a waveform diagram illustrating how errors occur in the conventional pen input display device when the distance between the ultrasonic transmitter and an ultrasonic receiver is wide.

By the reception sensitivity control, the pen input display device according to the present embodiment is able to match the received waveforms substantially at the same level, as shown in FIG. 4, irrespective of the distance between the ultrasonic transmitter and the ultrasonic receivers. This enables the respective received waveforms of the ultrasonic signals to be converted from analog data into digital data in the A/D converter circuits 17 and 18, without causing the problems described with reference to FIG. 19 and FIG. 20. As a result, desirable pen entry is realized that does not cause errors over the entire area of the display panel 10.

It should be noted here that the reception sensitivity control sections 43 and 44 generate sensitivity control signals based on the time values A and B generated in the delay time difference count circuit 19. However, the present invention is not just limited to this. For example, the sensitivity control signals may be generated based on the distance values A and B generated in the detected value processing sections 41 and 42, or the coordinates value (X, Y) generated in the coordinates conversion processing section 45.

[Second Embodiment]

In the pen input display device according to the foregoing First Embodiment, the reception sensitivities of the receivers are controlled based on the detection result of the distance between the ultrasonic transmitter and the ultrasonic receivers, so that the received waveforms are matched at substantially the same level for the entire area of the display panel 10. However, the present invention is not just limited to this. For example, the transmission intensity of the transmitter may be controlled based on the detection result of the distance between the ultrasonic transmitter and the ultrasonic receivers. This is described in the present embodiment.

Figure 5:
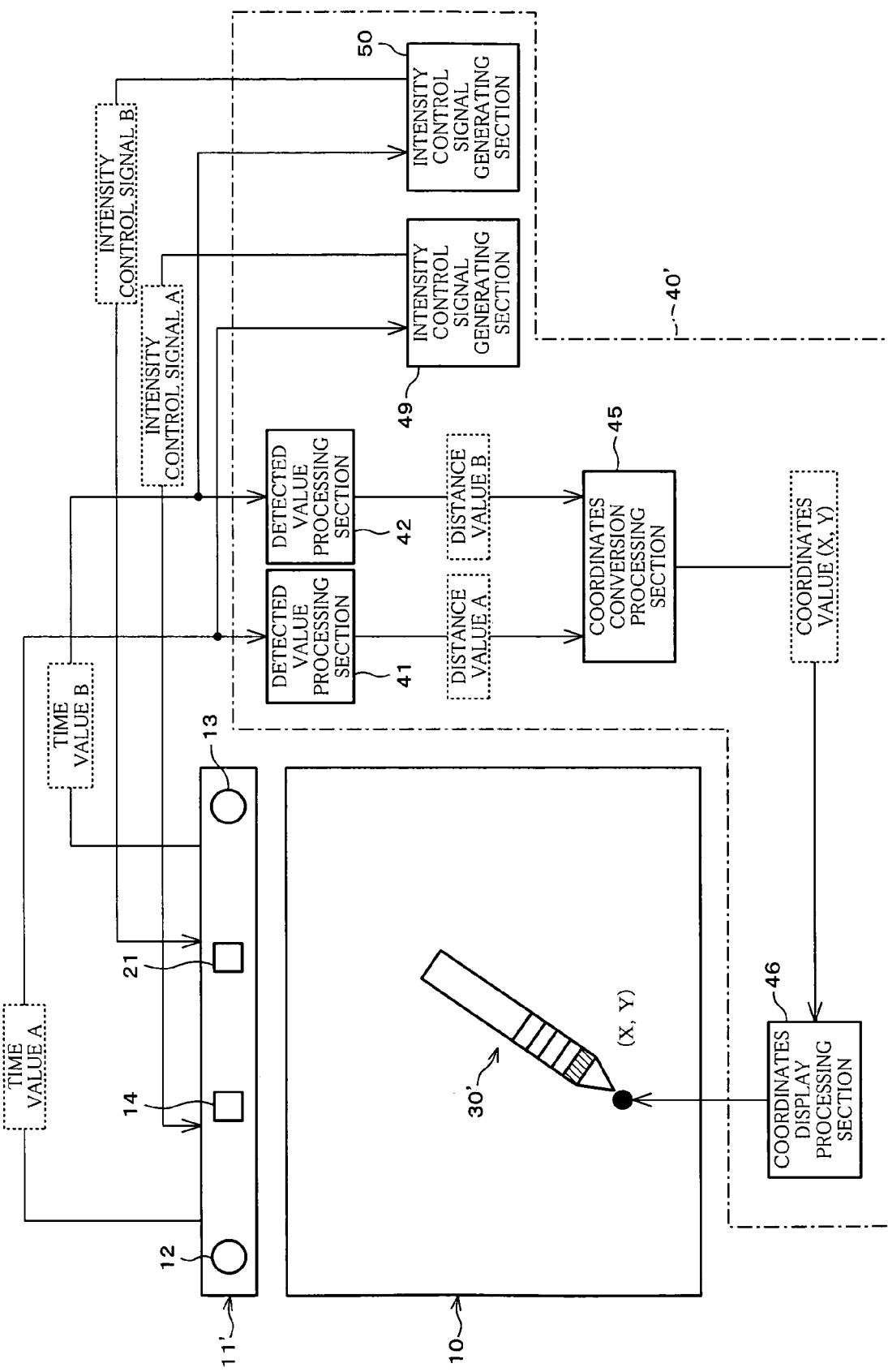
FIG. 5 is a block diagram showing a schematic configuration of a pen input display device according to another embodiment of the present invention.

FIG. 5 schematically illustrates a configuration of a pen input display device according to the present embodiment.

As shown in FIG. 5, the pen input display device according to the present embodiment includes a pen input unit 11', an input pen 30', and a display control section 40', which correspond to the pen input unit 11, the input pen 30, and the display control section 40, respectively, of the First Embodiment described with reference to FIG. 2.

Figure 6:
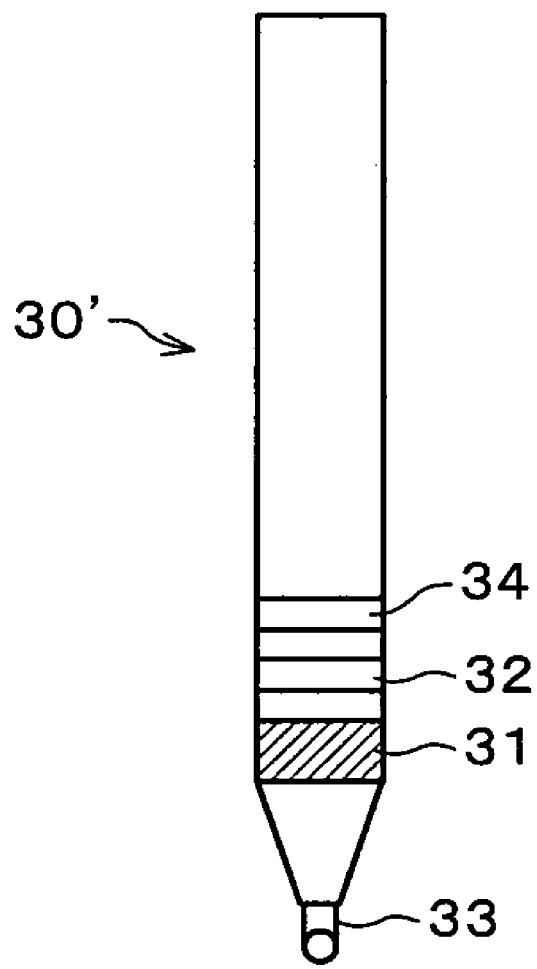
FIG. 6 is a drawing showing an input pen used with the pen input display device.

The pen input unit 11' includes an IR transmitter 21, in addition to the ultrasonic receivers 12 and 13 and the IR receiver 14 also provided for the pen input unit 11. The input pen 30' includes an IR receiver 34, in addition to the ultrasonic transmitter 31, the IR transmitter 32, and the switch 33 also provided for the input pen 30, as shown in FIG. 6. The display control section 40' includes intensity control signal generating sections 49 and 50, instead of the reception sensitivity control sections 43 and 44 of the display control section 40.

Figure 7:
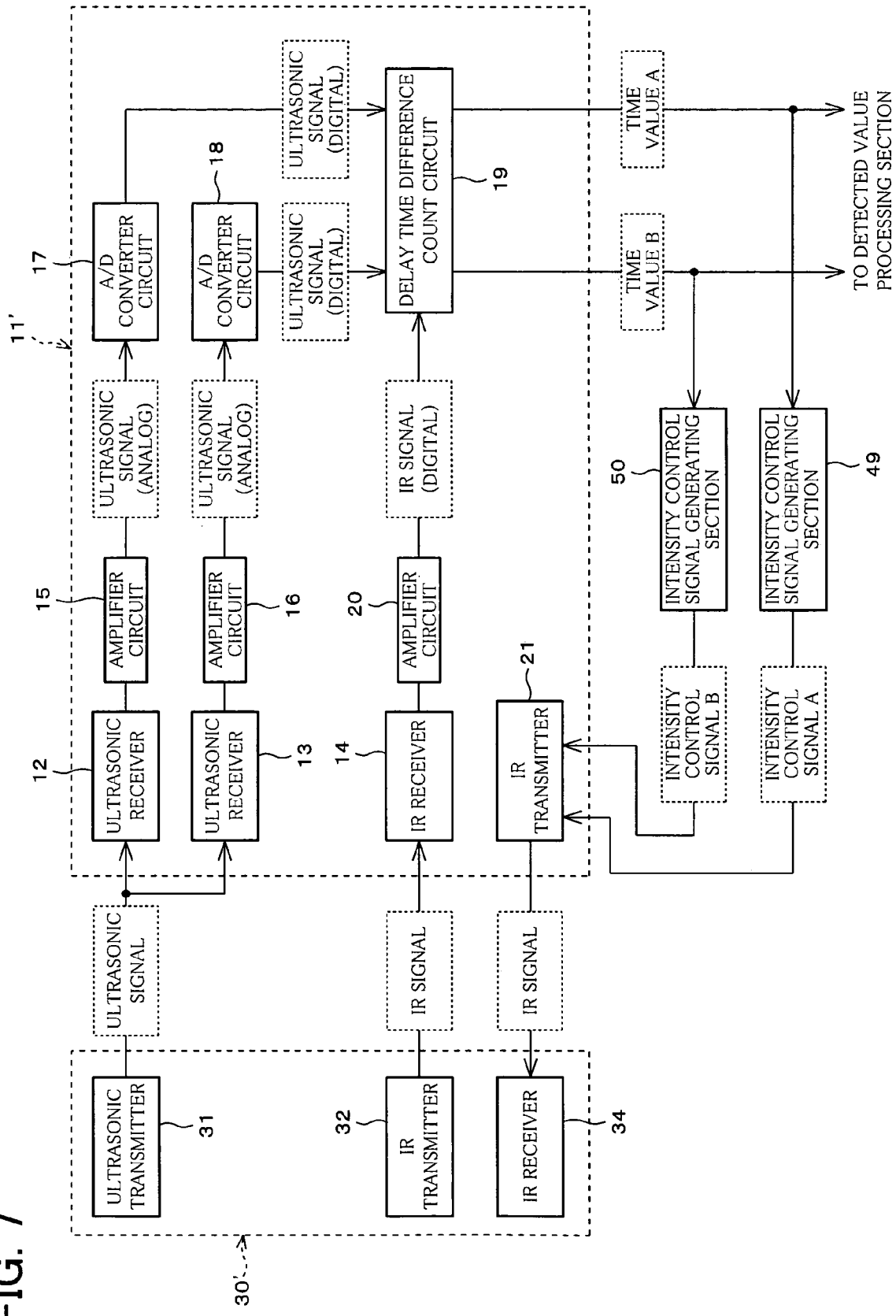
FIG. 7 is a block diagram showing a partial configuration of the pen input display device.

Referring to FIG. 7, the following describes the process operations of the pen input display device having the foregoing configuration. The structure diagramed in FIG. 7, partially showing the input pen 30', the pen input unit 11', and the display control unit 40', relates to functions of the pen input display device for adjusting transmission intensity of the input pen 30' to attain high detection accuracy and thereby prevent errors over the entire input area of the display panel 10.

When the input pen 30' contacts the liquid crystal display panel 10, the switch 33 installed at the tip of the pen is closed, enabling the ultrasonic transmitter 31 to transmit an ultrasonic signal. Simultaneously, the IR transmitter 32 transmits an IR signal. The delay of the ultrasonic signal from the transmission to the reception by the ultrasonic receivers 12 and 13 is measured in each of the ultrasonic receivers 12 and 13.

The ultrasonic signals received by the ultrasonic receivers 12 and 13 are amplified by amplifier circuits 15 and 16, respectively, and are converted from analog data to digital data in A/D converter circuits 17 and 18, respectively, to be sent to the delay time difference count circuit 19. The IR signal received by the IR receiver 14 is amplified by the amplifier circuit 20 and is supplied to the delay time different count circuit 19.

The delay time difference count circuit 19 detects signal delay times based on the respective waveforms of the ultrasonic signals and the IR signal it receives. The signal delay times, corresponding to the respective waveforms received by the ultrasonic receivers 12 and 13, are transmitted as time values A and B, respectively. The processes up to this point are the same as those described in the First Embodiment.

As shown in FIG. 5, the time value A transmitted from the delay time difference count circuit 19 is supplied to the detected value processing section 41 and the intensity control signal generating section 49 of the display control section 40'. Similarly, the time value B from the delay time difference count circuit 19 is supplied to the detected value processing section 42 and the intensity control signal generating section 50 of the display control section 40'. The time values A and B respectively supplied to the detected value processing sections 41 and 42 are processed by the coordinates conversion processing section 45 and the coordinates display processing section 46 to be used for the display control of the display section 10. This is carried out in the manner described in the First Embodiment.

The time values A and B supplied to the intensity control signal generating sections 49 and 50 are used for transmission intensity control for preventing errors over the entire area of the display panel 10. The feature of the pen input display device according to the present embodiment resides in the transmission intensity control. The following describes in detail how such control is carried out.

In the pen input display device according to the present embodiment, in response to the input of the time values A and B processed by the delay time difference count circuit 19, the intensity control signal generating sections 49 and 50, based on the respective values of the time values A and B, respectively generate signals for controlling values of transmission intensity of the ultrasonic signals transmitted from the input pen 30'. That is, the transmission intensity is decreased when the time values A and B are both small (close range), whereas the transmission intensity is increased when the time values A and B are both large (long range). Alternatively, the transmission intensity may be determined based on the average of time values A and B, for example, when the time value A is obtained in a close range and the time value B is obtained in a long range.

More specifically, the intensity control signal generating circuits 49 and 50, based on the input time values A and B, respectively determine the distance of the ultrasonic transmitter 31 from the ultrasonic receivers 12 and 13. The intensity control signal generating sections 49 and 50 then output the results as intensity control signals A and B (digital values), respectively.

Note that, the operations of the intensity control signal generating sections 49 and 50 are essentially the same as the operations of the reception sensitivity control sections 43 and 44 described in the First Embodiment. Likewise, the intensity control signals A and B are equivalent to the sensitivity control signals A and B (digital values) of the First Embodiment. Accordingly, the transmission intensity control signal generating sections 49 and 50 generate intensity control signals based on the time values A and B generated in the delay time difference count circuit 19. However, the present invention is not just limited to this. For example, the intensity control signals may be generated based on the distance values A and B generated in the detected value processing sections 41 and 42, or the coordinates value (X, Y) generated in the coordinates conversion processing section 45.

The intensity control signals A and B are transmitted as IR signals from the IR transmitter 21 of the pen input unit 11'. The IR signals are received by the IR receiver 34 of the input pen 30'.

Figure 8:
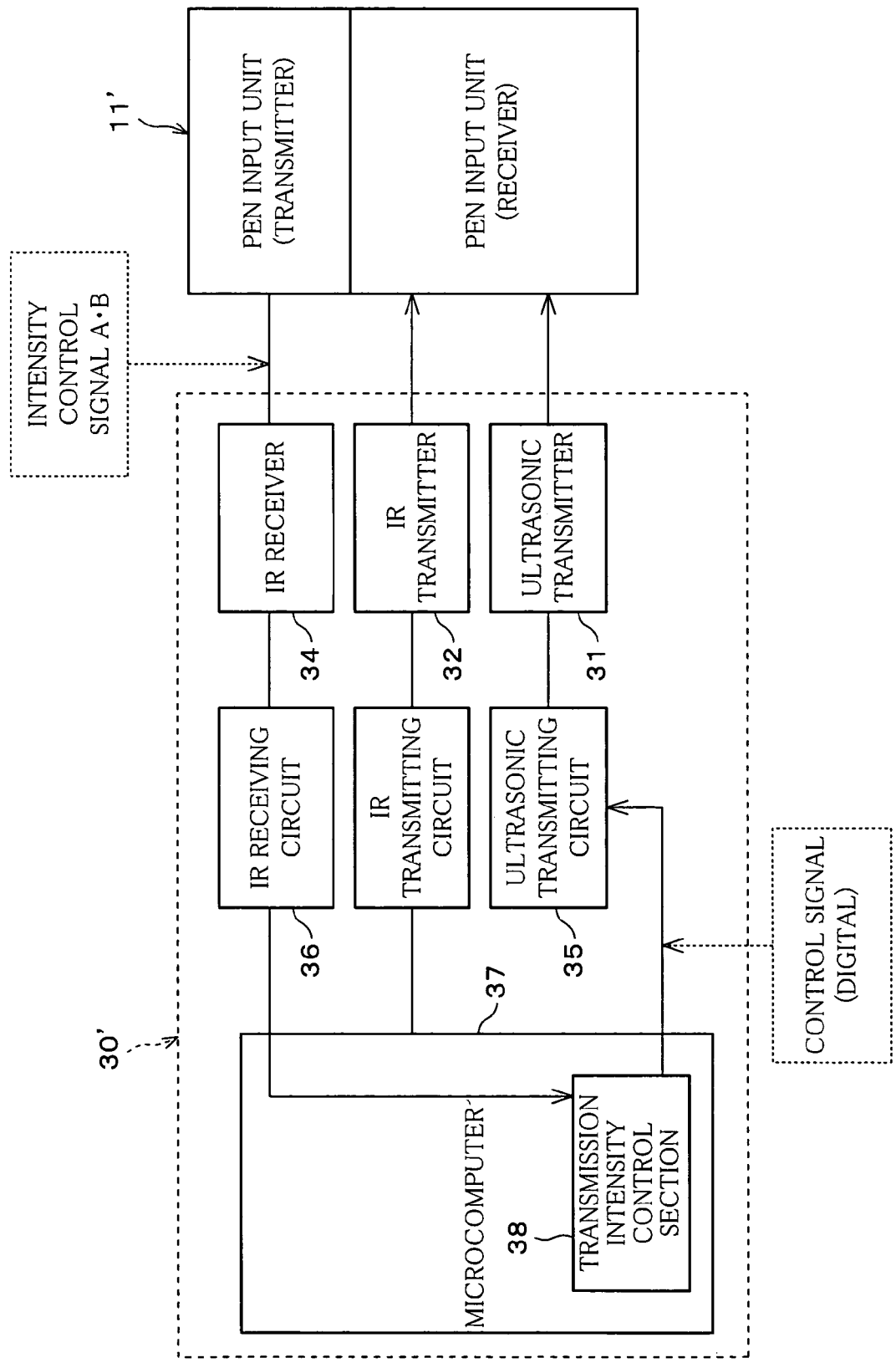
FIG. 8 is a block diagram showing a configuration of an input pen used with the pen input display device.
Figure 9:
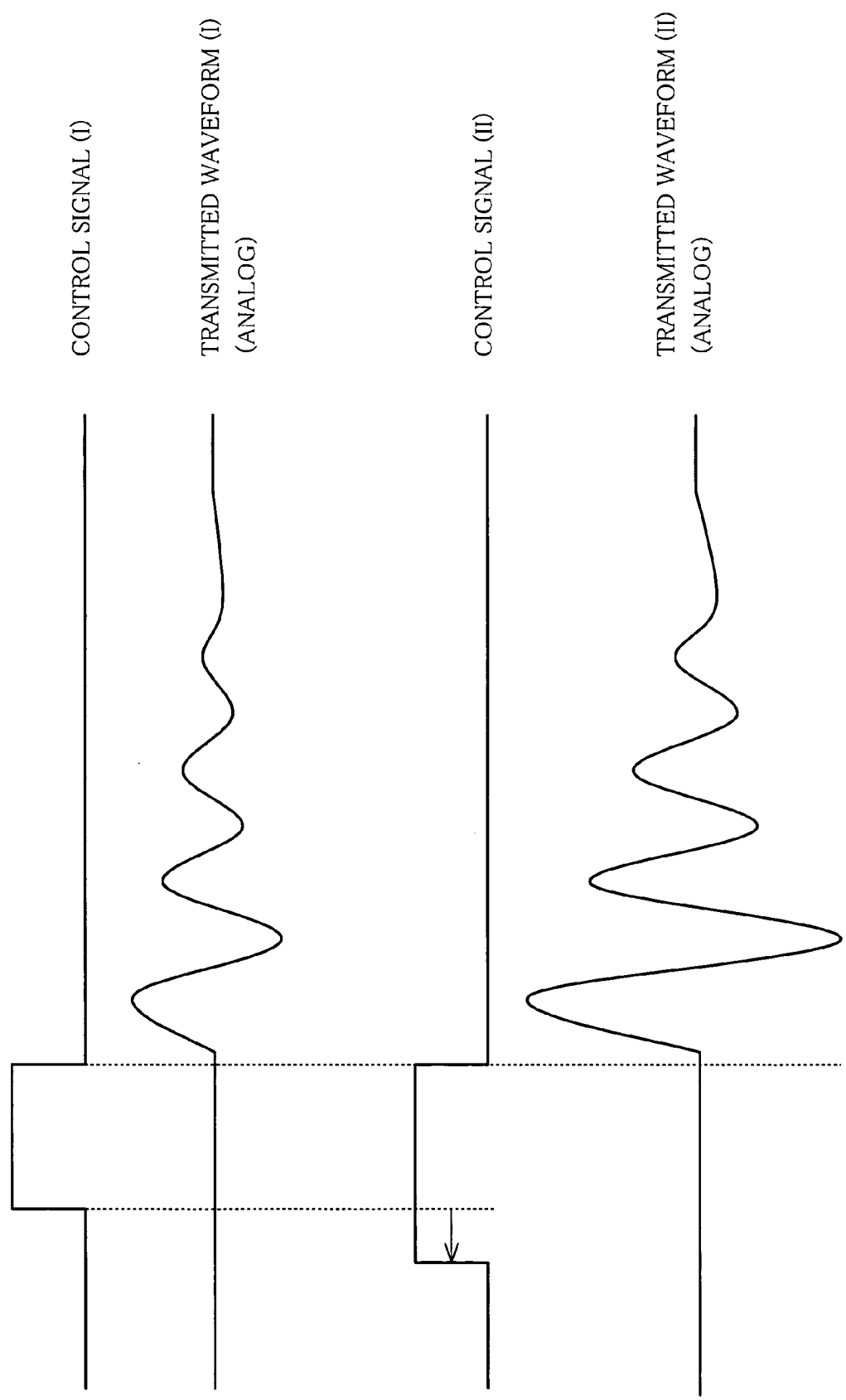
FIG. 9 is a waveform diagram showing control signals and transmitted waveforms of an ultrasonic signal transmitted from the input pen.
Figure 10:
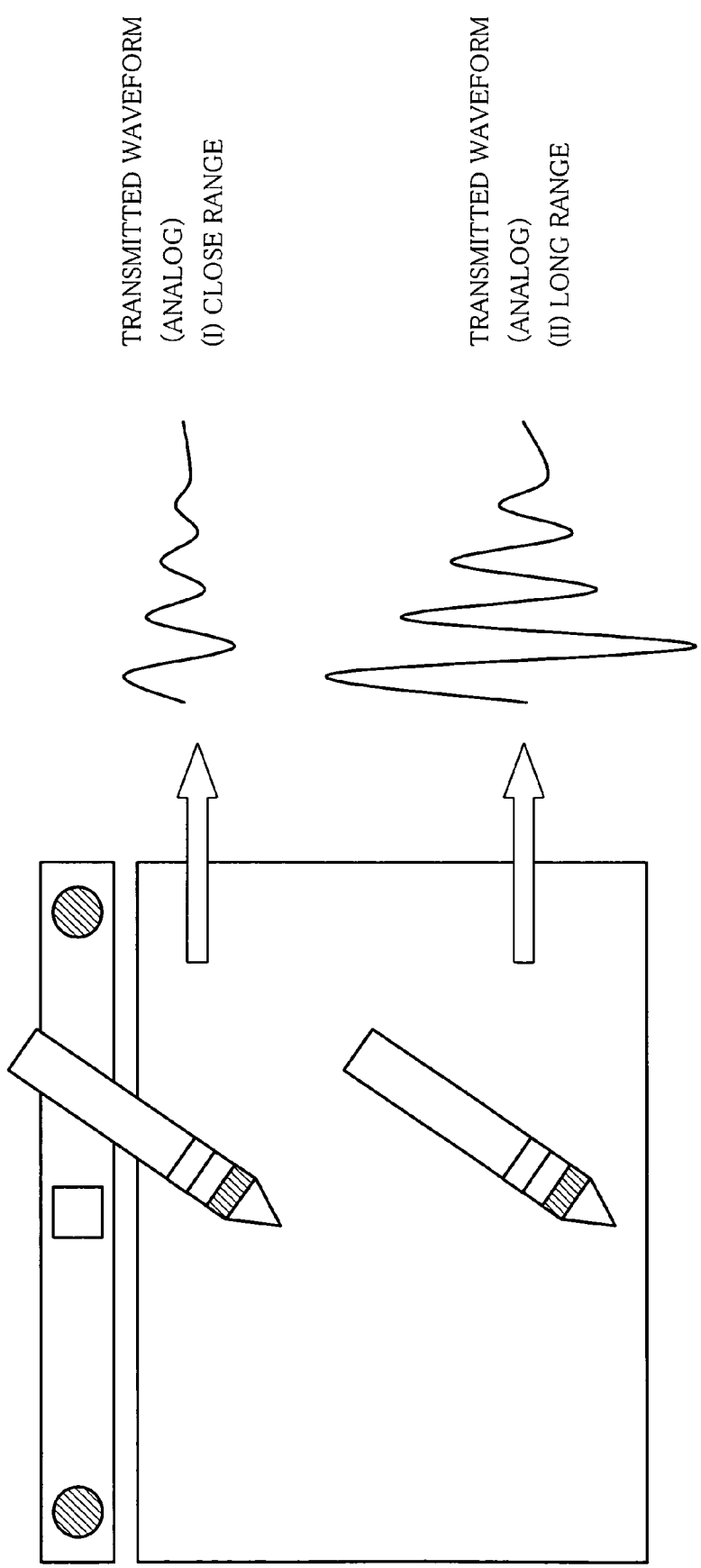
FIG. 10 is a drawing showing a spatial relationship of the input pen with the transmitted waveform of the ultrasonic signal transmitted from the input pen.
Figure 11:
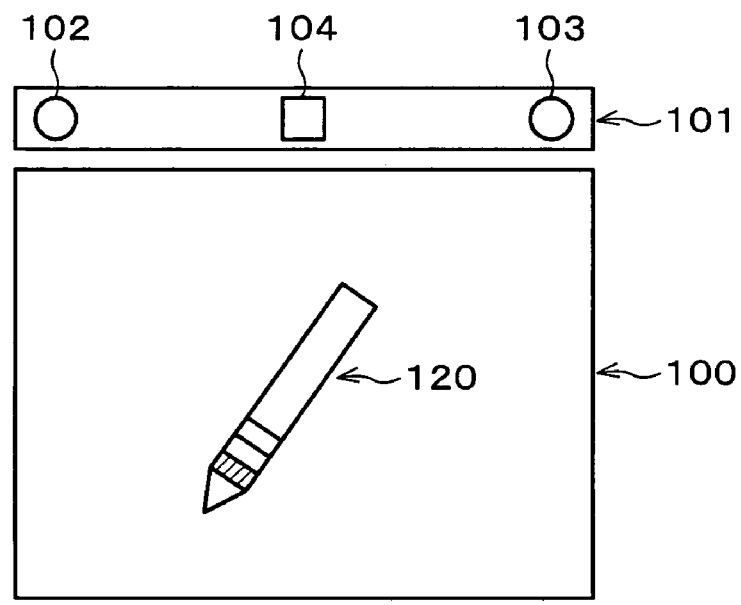
FIG. 11(*a*) is a plan view of a conventional pen input display device employing an ultrasonic pen input system, and FIG. 11(*b*) is a drawing showing an input pen used with the pen input display device.
Figure 11:
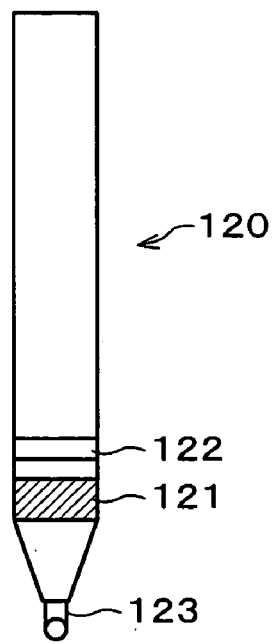
Figure 12:
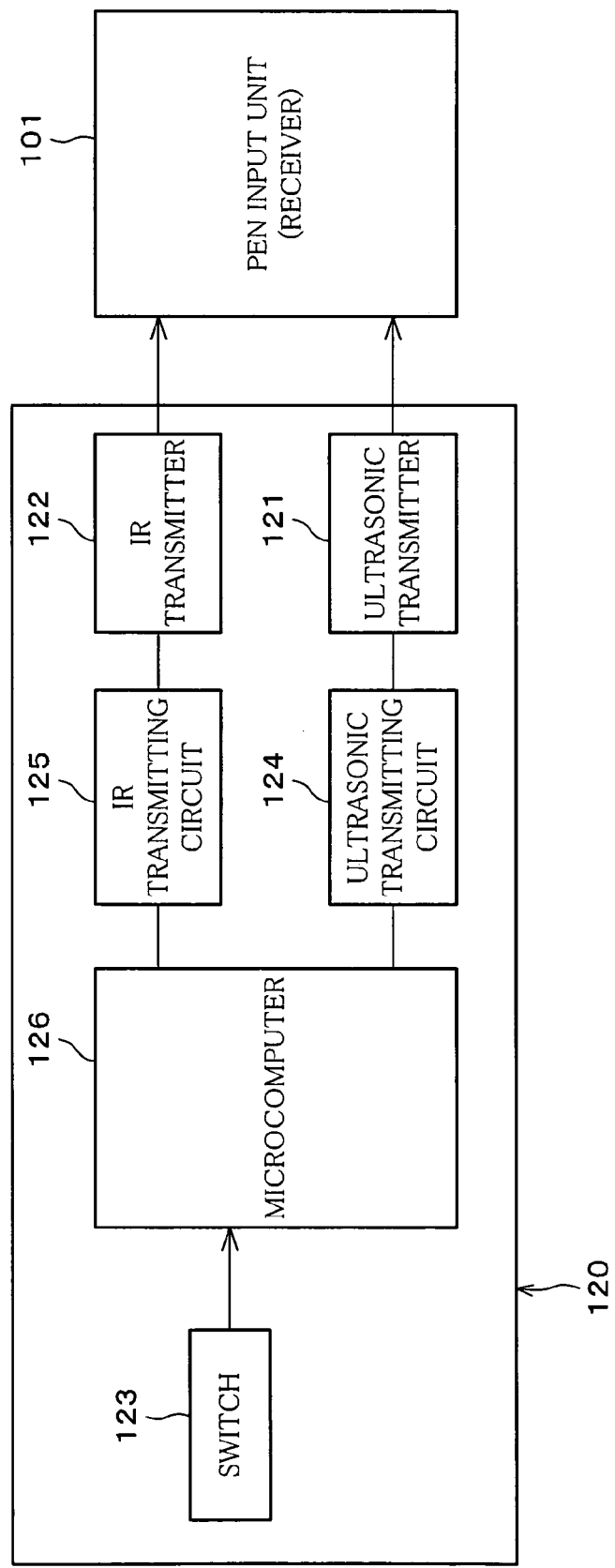
FIG. 12 is a block diagram showing an internal configuration of the input pen shown in FIG. 11(*b*).
Figure 13:
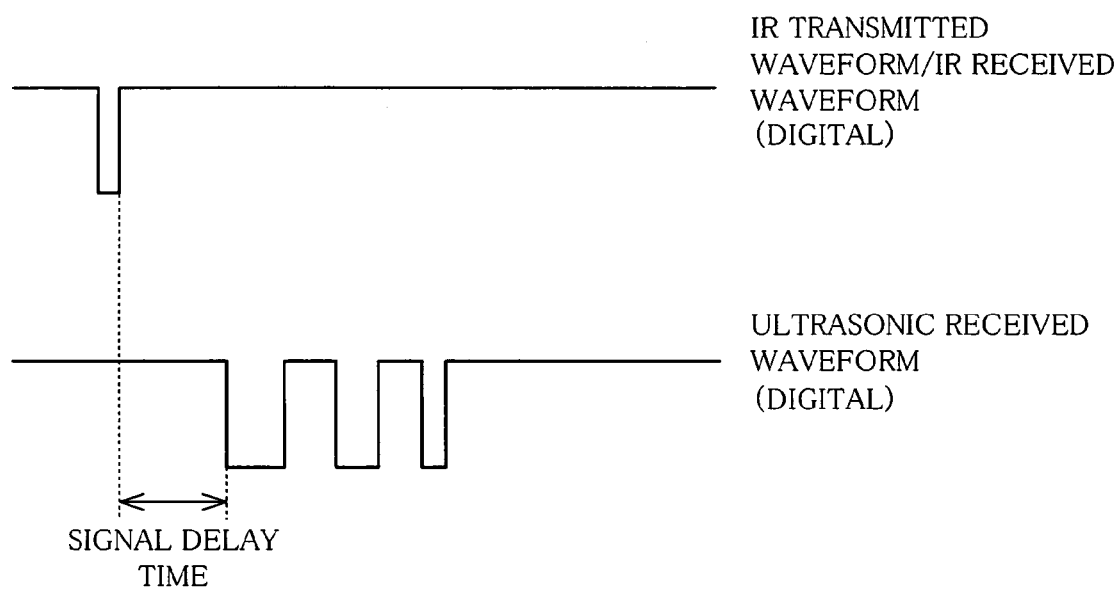
FIG. 13 is a waveform diagram showing delay time of an ultrasonic signal used in the pen input display device of an ultrasonic pen input system.
Figure 14:
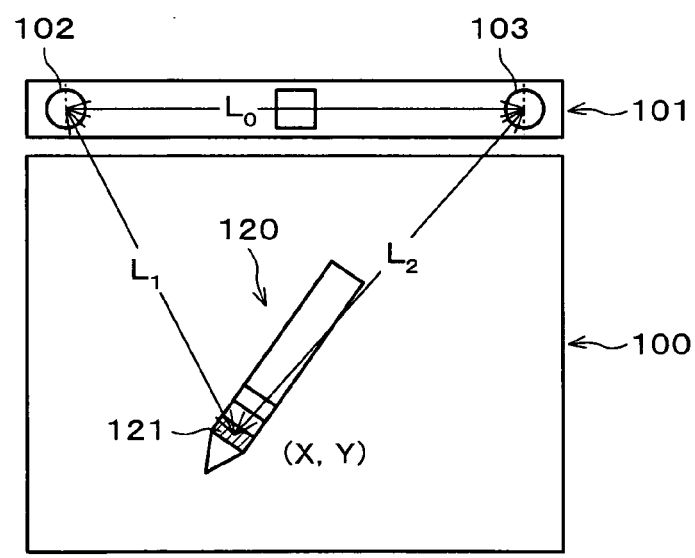
FIG. 14 is a plan view showing how the coordinates of pen entry are calculated in the pen input display device of an ultrasonic pen input system.
Figure 15:
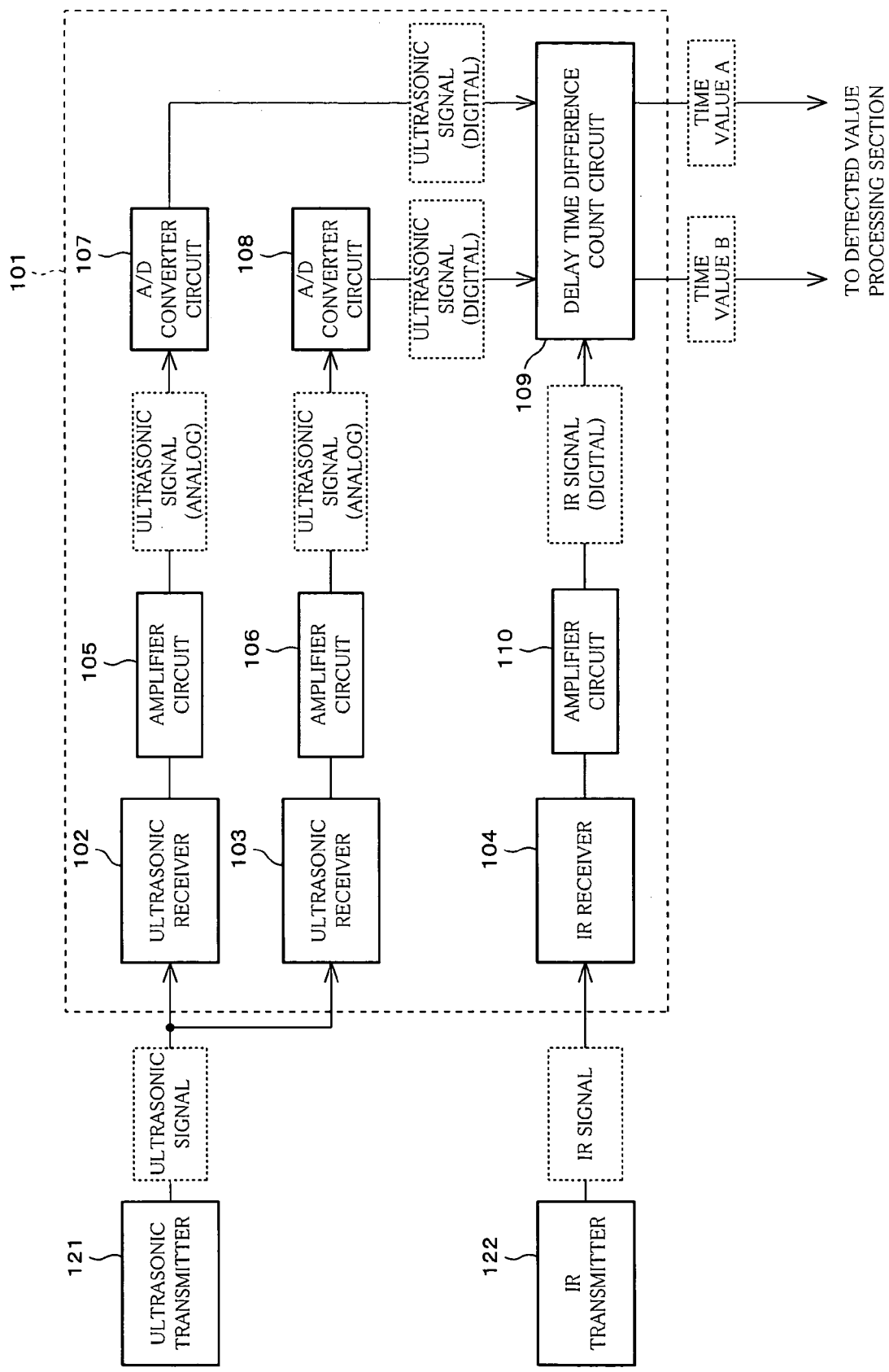
FIG. 15 is a block diagram showing a partial configuration of the conventional pen input display device of an ultrasonic pen input system.

Referring to FIG. 8 through FIG. 10, description is made below as to the operations after the intensity control signals A and B are received by the input pen 30'.

The intensity control signals A and B received by the IR receiver 34 of the input pen 30' are supplied via an IR transmission circuit 36 to a transmission intensity control section 38 of a microcomputer 37, which is a control section for the input pen 30'. Based on the input intensity control signals A and B, the transmission intensity control section 38 varies a control signal to be supplied to a ultrasonic transmission circuit 35, so as to control the output of the ultrasonic transmitter 31, i.e., transmission intensity of the ultrasonic signal.

In the present embodiment, a received waveform control section for controlling transmission intensity of an ultrasonic transmission section corresponds to (1) the intensity control signal generating sections 49 and 50 for generating intensity control signals based on time values A and B, (2) the IR transmitter 21 and the IR receiver 34 which together serve as means to enter the intensity control signals to the input pen 30', and (3) the transmission intensity control section 38 for controlling transmission intensity in the input pen 30'.

Figure 17:
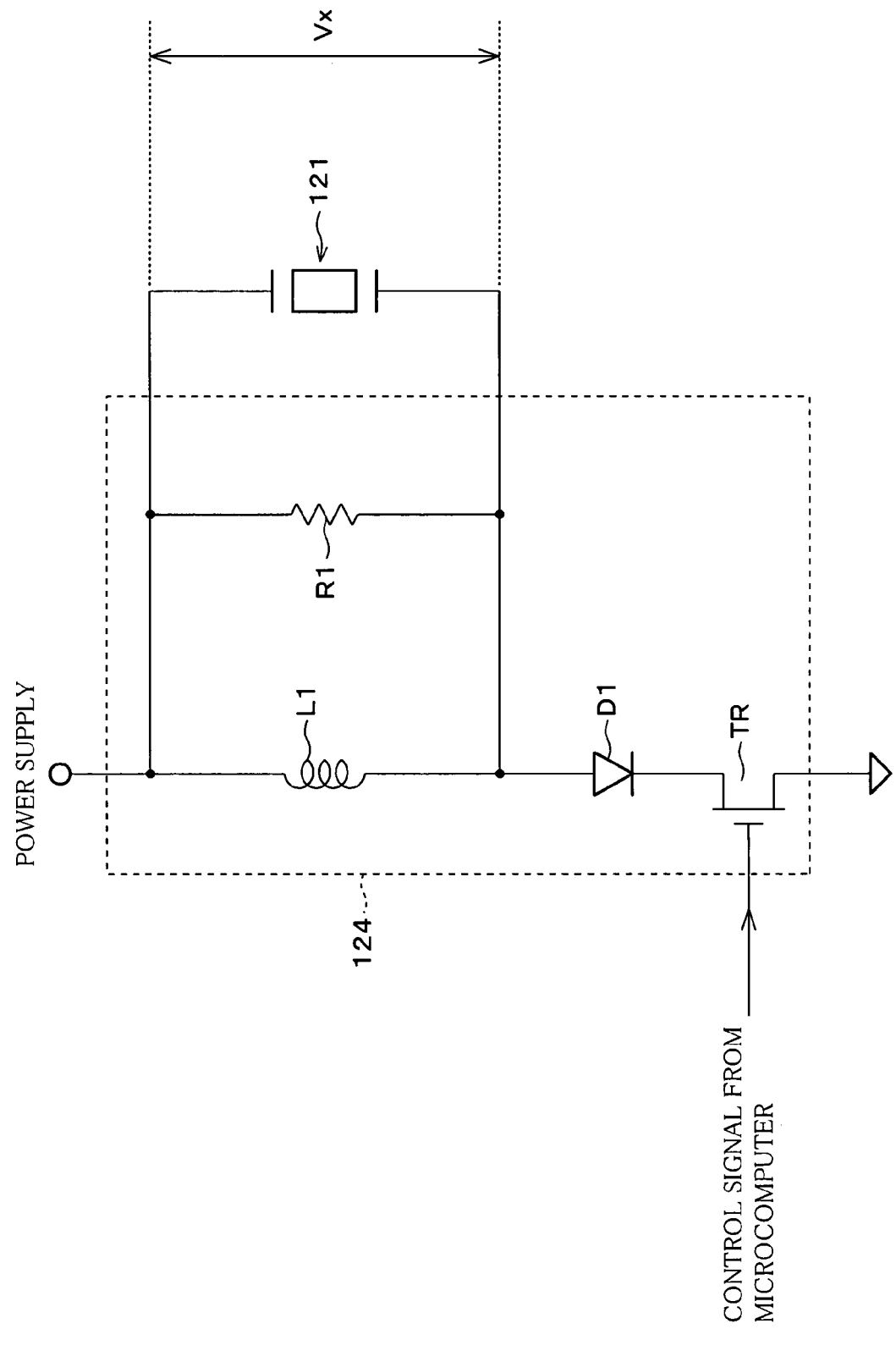
FIG. 17 is a circuit diagram showing a structure of an ultrasonic transmitter in the pen input display device.
Figure 18:
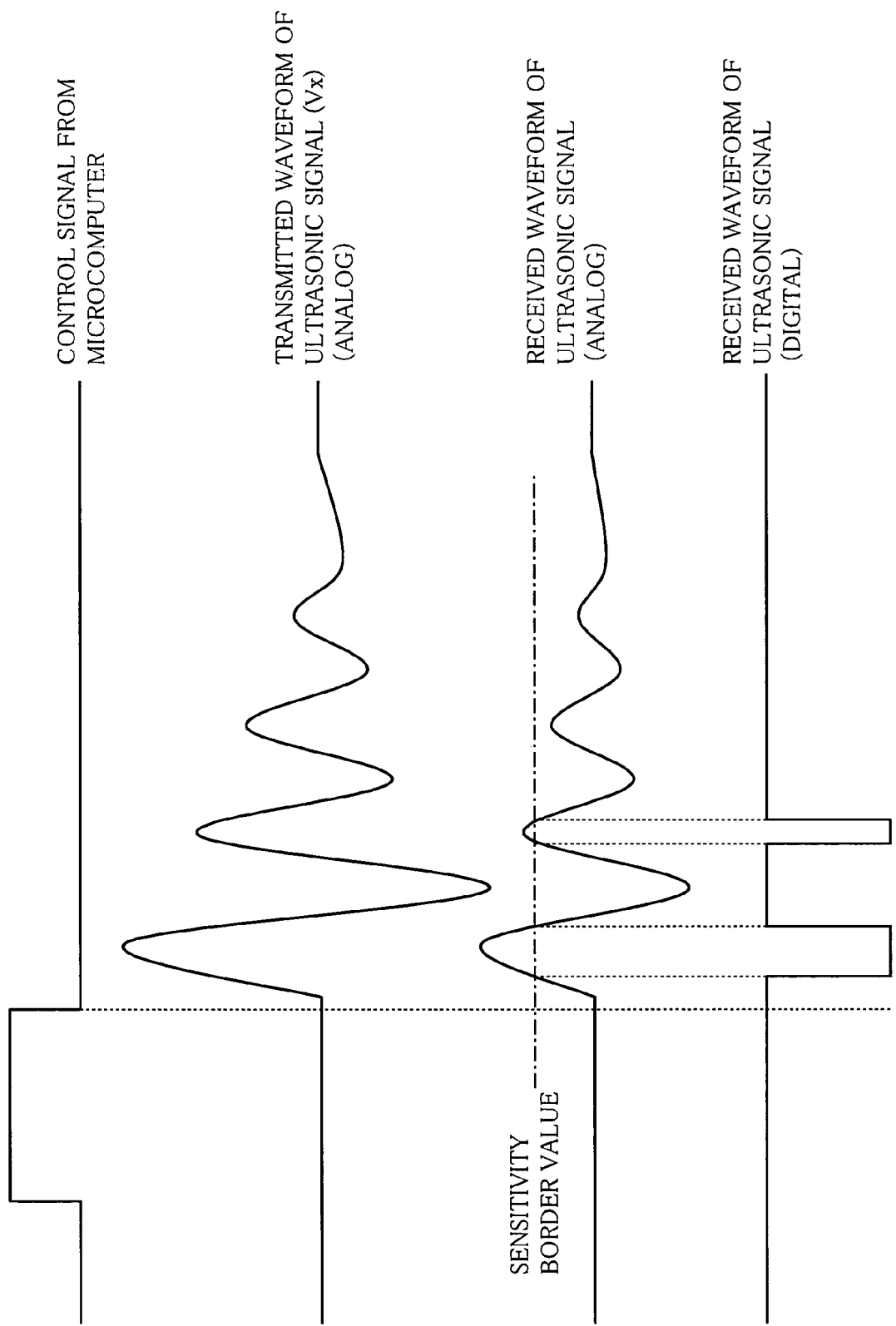
FIG. 18 is a waveform diagram showing how the ultrasonic signal is transmitted and received in the pen input display device.

Here, the ultrasonic transmission circuit 35 may have the same configuration as the ultrasonic transmission circuit 124 shown in FIG. 17. In this case, the control signal generated by the transmission intensity control section 38 serves as a signal for controlling ON/OFF of the switching element TR.

The transmission intensity control section 38 varies the length of an ON period of the control signal based on the intensity control signals A and B. This is based on the fact that the oscillation intensity (i.e., transmission intensity) of the ultrasonic signal can be increased when the control signal has a long ON period. Specifically, as shown in FIG. 9, comparing a control signal (I) and a control signal (II), the control signal (II) with a longer ON period produces greater energy that can be charged to a coil L1 and thereby increases the amount of current that flows into the ultrasonic transmitter 31.

That is, the transmission intensity control section 38 determines the distance between the ultrasonic transmitter and the ultrasonic receivers based on the input intensity control signals A and B, and outputs a control signal based on the resultant distance to control the transmission intensity of the ultrasonic signal. More specifically, as shown in FIG. 10, such control is carried out that the transmission intensity of the ultrasonic signal is decreased in a close range where attenuation of the signals received by the ultrasonic receivers 12 and 13 is small, and that the transmission intensity of the ultrasonic signal is increased in a long range where attenuation of the signals received by the ultrasonic receivers 12 and 13 is large.

As a result, by the transmission intensity control, the pen input display device according to the present embodiment is able to reduce the difference in level of the received waveforms that vary as a function of the distance between the ultrasonic transmitter and the ultrasonic receivers. This enables the respective received waveforms of the ultrasonic signals to be converted from analog data into digital data in the A/D converter circuits 17 and 18, without causing the problems described with reference to FIG. 19 and FIG. 20. As a result, desirable pen entry is realized that does not cause errors over the entire area of the display panel 10.

In the pen input display device according to the present embodiment, the transmission intensity of the ultrasonic signal is adjusted according to the position of the input pen 30'. Thus, a suitable transmission intensity can be set according to the distance between the ultrasonic transmitter and the ultrasonic receivers. As a result, the transmission intensity does not become excessively large, for example, when the distance between the ultrasonic transmitter and the ultrasonic receivers is small, thereby realizing efficient driving without wasting power in the input pen 30'. Since the input pen 30' generally operates on an internal battery, reducing the power consumption of the input pen 30' is advantageous in extending the operating hours of the input pen 30'.

In the driving according to the present embodiment, the power consumed by the IR receiver 34 of the input pen 30' is insignificant because the power required for IR reception is much smaller than that for ultrasonic transmission or IR transmission.

It should be appreciated that the present invention, which was described in the foregoing First and Second Embodiments based on the display device of an input/output integrated type in which pen entry is directly made to the display panel, is not just limited to this particular type of display device. For example, the present invention is also applicable to external input devices such as digitizers (used to enter coordinates in machine tools). That is, the pen input display device of the present invention is only required to detect at least the coordinates of the input pen position on the display panel, and accordingly it is not necessarily required to carry out display control using the detected coordinates of the input pen position.

Further, the type of display panel used is not particularly limited. For example, liquid crystal display panels, CRTs (Cathode-Ray Tube), PDPs (Plasma Display Panel), and organic EL displays may be used as well.

As described, a pen input display device of the present invention is for making pen entry on a display panel using an input pen having an ultrasonic transmitting section, the pen input display device including at least two ultrasonic receiving sections that are in a fixed spatial relationship with the display panel, the pen input display device including: a distance detecting section for detecting a parameter that directly or indirectly indicates a distance of the ultrasonic transmitting section from each of the ultrasonic receiving sections; and a received waveform control section for carrying out control of reducing a difference in level of received waveforms, based on a result of detection by the distance detecting section, when the ultrasonic receiving section receive an ultrasonic signal from the ultrasonic transmitting section.

As a rule, in the pen input display device employing an ultrasonic pen input system using an input pen with an ultrasonic transmitting section, the attenuation of the ultrasonic signal becomes greater on the receiver end as the distance of the ultrasonic transmitting section from the ultrasonic receiving section (the distance between the ultrasonic transmitter and the ultrasonic receiver) is increased. Accordingly, the level of the received waveform in the ultrasonic receiving section varies depending on the distance between the ultrasonic transmitter and the ultrasonic receiver. Errors occur when the received waveforms are at different levels.

However, according to the foregoing configuration, the distance detecting section directly or indirectly detects a distance between the ultrasonic transmitter and each of the ultrasonic receivers, and the received waveform control section carries out the control of reducing a difference in level of the respective received waveforms in the ultrasonic receiving section based on the result of detection. In this way, the errors caused by different levels of the received waveforms can be restricted. As a result, a pen input display device is provided that can prevent errors over the entire input area of the display panel.

The distance detecting section directly or indirectly detects a distance between the ultrasonic transmitter and an ultrasonic receiver. That is, in the ultrasonic pen input system, the distance between the ultrasonic transmitter and the ultrasonic receiver is determined by converting a delay time difference (time value) of the ultrasonic signal into a distance value. The time value, being a parameter that indirectly indicates the distance between the ultrasonic transmitter and the ultrasonic receiver, can thus be used to control received waveforms.

The pen input display device may be adapted so that the received waveform control section controls reception sensitivity of the ultrasonic receiving section, whereby reception sensitivity is decreased for an ultrasonic receiving section whose distance from the ultrasonic transmitting section is short, and is increased for an ultrasonic receiving section whose distance from the ultrasonic transmitting section is long.

According to this configuration, the received waveform control section, based on the result of detection by the distance detecting section, decreases the reception sensitivity of the ultrasonic receiving section that was found to be in a close range from the ultrasonic transmitting section, and increases the reception sensitivity of the ultrasonic receiving section that was found to be far from the ultrasonic transmitting section.

The reception sensitivity control can be individually carried out for each of a plurality of ultrasonic receiving sections, making it possible to set the optimum reception sensitivity for each ultrasonic receiving section.

Further, the pen input display device may be adapted so that each of the ultrasonic receiving section includes an ultrasonic receiver and an amplifier circuit for amplifying an output of the respective ultrasonic receiver, and the received waveform control section carries out such control that a gain of the amplifier circuit is decreased for an ultrasonic receiving section whose distance from the ultrasonic transmitting section is short, and is increased for an ultrasonic receiving section whose distance from the ultrasonic transmitting section is long.

According to this configuration, the reception sensitivity of the ultrasonic receiving section can be controlled with a simple structure.

Further, the pen input display device may be adapted so that the received waveform control section controls transmission intensity of the ultrasonic transmitting section, whereby transmission intensity of the ultrasonic transmitting section is decreased when the distance of the ultrasonic transmitting section from the ultrasonic receiving section is short, and is increased when the distance of the ultrasonic transmitting section from the ultrasonic receiving section is long.

According to this configuration, the received waveform control section, based on the result of detection by the distance detecting section, decreases the transmission intensity of the ultrasonic transmitting section when the distance of the ultrasonic transmitting section from the ultrasonic receiving section is found to be short, and increases the transmission intensity of the ultrasonic transmitting section when the distance of the ultrasonic transmitting section from the ultrasonic receiving section is found to be long.

With such transmission intensity control, the transmission intensity of the ultrasonic transmitting section can be set to an optimum value according to the distance between the ultrasonic transmitting section and the ultrasonic receiving section, thereby saving power consumption of the ultrasonic transmitting section. As a result, the input pen, which usually operates on a battery, can have longer operating hours.

Further, the pen input display device may be adapted so that the ultrasonic transmitting section includes (1) a transmitting circuit including a coil, a switch section, and a resistor, the coil and the switch section being serially connected to each other, and the coil and the resistor being connected parallel to each other, and (2) an ultrasonic transmitter connected parallel to the coil of the transmitting circuit, and that the received waveform control section carries out such control that a length of an ON period of a control signal for controlling ON/OFF of the switch section of the transmitting circuit is decreased when the distance of the ultrasonic transmitting section from the ultrasonic receiving section is short, and is increased when the distance of the ultrasonic transmitting section from the ultrasonic receiving section is long.

According to this configuration, the transmission intensity of the ultrasonic transmitting section can be controlled with a simple structure.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A pen input display device for making pen entry on a display panel using an input pen having an ultrasonic transmitting section, the pen input display device including at least two ultrasonic receiving sections that are in a fixed spatial relationship with the display panel, said pen input display device comprising:

a distance detecting section for detecting a parameter that directly or indirectly indicates a distance of the ultrasonic transmitting section from each of the ultrasonic receiving sections and outputting a value of the parameter as a digital signal; and a received waveform control section for carrying out control of reducing a difference in level of received waveforms, using the digital signal of the value of the parameter detected by the distance detecting section, when the ultrasonic receiving sections receive an ultrasonic signal from the ultrasonic transmitting section, wherein the digital signal is a time value indicating a time for an ultrasonic signal to travel from the ultrasonic transmitting section to the ultrasonic receiving sections.

2. The pen input display device as set forth in claim 1, wherein:

the received waveform control section controls reception sensitivity of the ultrasonic receiving sections, whereby reception sensitivity is decreased for an ultrasonic receiving section whose distance from the ultrasonic transmitting section is short, and is increased for an ultrasonic receiving section whose distance from the ultrasonic transmitting section is long.

3. The pen input display device as set forth in claim 2, wherein:

each of the ultrasonic receiving sections includes an ultrasonic receiver and an amplifier circuit for amplifying an output of the respective ultrasonic receiver; and the received waveform control section carries out such control that a gain of the amplifier circuit is decreased for an ultrasonic receiving section whose distance from the ultrasonic transmitting section is short, and is increased for an ultrasonic receiving section whose distance from the ultrasonic transmitting section is long.

4. A pen input display device input display device for making pen entry on a display panel using an input pen having an ultrasonic transmitting section, the pen input display device including at least two ultrasonic receiving sections that are in a fixed spatial relationship with the display panel, said pen input display device comprising:

a distance detecting section for detecting a parameter that directly or indirectly indicates a distance of the ultrasonic transmitting section from each of the ultrasonic receiving sections; and a received waveform control section for carrying out control of reducing a difference in level of received waveforms, based on a result of detection by the distance detecting section, when the ultrasonic receiving sections receive an ultrasonic signal from the ultrasonic transmitting section, wherein the received waveform control section controls transmission intensity of the ultrasonic transmitting section, whereby transmission intensity of the ultrasonic transmitting section is decreased when the distance of the ultrasonic transmitting section from the ultrasonic receiving section is short, and is increased when the distance of the ultrasonic transmitting section from the ultrasonic receiving section is long.

5. The pen input display device as set forth in claim 4, wherein the ultrasonic transmitting section comprises:

a transmitting circuit including a coil, a switch section, and a resistor, the coil and the switch section being serially connected to each other, and the coil and the resistor being connected parallel to each other; and an ultrasonic transmitter connected parallel to the coil of the transmitting circuit, and wherein the received waveform control section carries out such control that a length of an ON period of a control signal for controlling ON/OFF of the switch section of the transmitting circuit is decreased when the distance of the ultrasonic transmitting section from the ultrasonic receiving section is short, and is increased when the distance of the ultrasonic transmitting section from the ultrasonic receiving section is long.

* * * * *